United States Patent [19]

Akao

[11] Patent Number: 5,227,255
[45] Date of Patent: Jul. 13, 1993

[54] PACKAGING MATERIAL FOR PHOTOGRAPHIC PHOTOSENSITIVE MATERIALS

[75] Inventor: Mutsuo Akao, Kanagawa, Japan

[73] Assignee: Fuji Photo Film Co., Ltd., Ashigara, Japan

[21] Appl. No.: 594,003

[22] Filed: Oct. 9, 1990

[30] Foreign Application Priority Data

Oct. 9, 1989 [JP] Japan .................. 1-262179

[51] Int. Cl.⁵ ............................................. B32B 27/08
[52] U.S. Cl. .................................. 428/476.1; 428/910
[58] Field of Search .................. 428/475.8, 476.1, 220, 428/461, 35.2, 215, 216, 910, 214, 323, 324, 35.3, 458, 36.92, 34.3, 34.2, 35.8; 242/71.1, 71.8, 68.7; 220/3.5 R; 430/524; 426/127

[56] References Cited

U.S. PATENT DOCUMENTS

| | | | |
|---|---|---|---|
| 4,356,224 | 10/1982 | Akao et al. | 428/220 |
| 4,411,945 | 10/1983 | Akao et al. | 428/216 |
| 4,663,218 | 5/1987 | Akao | 428/461 X |
| 4,784,906 | 11/1988 | Akao | 428/324 |

*Primary Examiner*—Thomas J. Herbert, Jr.
*Attorney, Agent, or Firm*—Burns, Doane, Swecker & Mathis

[57] ABSTRACT

A packaging material for photographic photosensitive materials which comprises a biaxially stretched polyamide resin film layer and a very low density ethylene-α-olefin copolymer resin film layer laminated through an adhesive layer and contains a light shielding material at least in one layer. By laminating the very low density ethylene-α-olefin copolymer resin film to the biaxially stretched polyamide resin film through the adhesive layer, tear strength, impact strength and the like of the laminated film are improved by the notch effect. Particularly, resistance to the occurrence of pinholes is much superior to the other laminated films containing similar ethylene-α-olefin copolymer resin film layer.

6 Claims, 1 Drawing Sheet

PACKAGING MATERIAL FOR PHOTOGRAPHIC PHOTOSENSITIVE MATERIALS

BACKGROUND OF THE INVENTION

This invention relates to a packaging material suitable for packaging photographic photosensitive materials.

For materials that lose their value by exposing them to light, such as photographic photosensitive materials, packaging materials capable of shielding completely from light are used. The packaging materials are necessary to have sealability, moistureproofness and gas barrier properties, without the occurrence of pinholes, in addition to the light-shielding ability. Moreover, it is necessary to have sufficient physical strength and antistatic property to prevent spark discharge and the like. Good bag-making ability, inexpensiveness and excellent appearance are also required. It is difficult to satisfy these properties by using a single film material, and a conventional packaging material is a laminated film shown in FIG. 7 composed of a polyester layer 12, an adhesive layer 13, an aluminum layer 14 and a polyolefin resin layer 15a containing a light-shielding material and a nonionic antistatic agent (Japanese Patent KOKOKU No. 63-26697). The applicant disclosed a packaging material comprising a laminate composed of a paper support and a thermoplastic resin layer formed of a blended resin of high density polyethylene resin and low density polyethylene resin laminated onto at least one side of the paper support (Japanese Patent KOKAI No. 60-35728). Furthermore, the applicant disclosed a packaging material of a laminated film comprising a coextruded double layer film consisting of a linear low density polyethylene resin film layer 16a containing a light-shielding material having a mean particle size of less than 200 mμ and a high density polyethylene resin film layer 17a, as shown in FIG. 8 (Japanese Patent KOKAI No. 63-85539).

The packaging material disclosed in Japanese Patent KOKOKU No. 63-26697 is inferior not only in resistance to the occurrence of pinholes but also in physical strength and heat sealing properties. As a result, bag rupture and light leakage trouble frequently occurred. Although the packaging material disclosed in Japanese Patent KOKAI No. 60-35728 is excellent in antistatic property and light shielding ability, it is inferior in resistance to the occurrence of pinholes, moistureproofness, gas barrier, physical strength and heat sealing properties. The packaging material disclosed in Japanese Patent KOKAI No. 63-85539 is excellent in antistatic property, but it is inferior in physical strength and oxygen barrier. Therefore, bag rupture was liable to occur during transportation. It is also inferior in heat sealing properties, and heat seal strength is gradually lowered.

SUMMARY OF THE INVENTION

An object of the invention is to provide a packaging material for photographic photosensitive materials excellent in resistance to the occurrence of pinholes, physical strength, antistatic property, moistureproofness, oxygen barrier and light-shielding ability.

The present invention provides a packaging material for photographic photosensitive materials which achieves such an object, which comprises a biaxially stretched polyamide resin film layer and a very low density ethylene-α-olefin copolymer resin film layer laminated through an adhesive layer and contains a light-shielding material at least in one layer.

Figure 1:
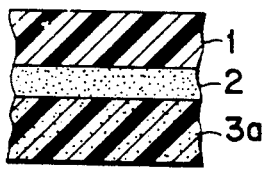
FIGS. 1 through 6 are partial sectional views indicating the layer constructions of preferred embodiments of the invention.

1,1a ... Biaxially stretched polyamide resin film layer
2,2a ... Adhesive layer
3,3a ... Very low density ethylene-α-olefin copolymer resin film layer
a ... Indicating the presence of a light-shielding material
B ... Blocking portion

DETAILED DESCRIPTION OF THE INVENTION

The biaxially stretched polyamide resin film layer improves resistance to the occurrence of pinholes and improves oxygen barrier. Bag making ability is rendered excellent by the heat resistance of this layer. Moreover, since Young's modulus is great, shock resistance is improved. The layer is resistant to elongation when a heavy material is packaged, and prevents the degradation of light-shielding due to the elongation of the biodegradable, and reduces pollution. Suitable polyamide resins are linear polymers having amide groups in the molecular chain and includes nylon 6, nylon 66, nylon 610, nylon 11 and nylon 12. The polyamide resins may be blends or copolymers as well as homopolymers. Nylon 6 and nylon 66 are particularly preferred. Biaxial stretching may be conducted by a known method such as by simultaneously biaxial stretching or successively biaxial stretching using a T die film molding machine or an inflation film molding machine provided with a biaxially stretching mechanism. A suitable drawing ratio is 1.5 to 20 times, preferably 3 to 15 times in both directions of the longitudinal direction (MD) and the lateral direction (CD). The thickness of the biaxially stretched polyamide resin film is preferably 10 to 50 μm. When the thickness is less than 10 μm, longitudinal streaks or cuts are liable to occur in the lamination process. While, when the thickness is beyond 50 μm, the rigidity of the film is too great. As a result, the bag-making ability and handling of the film is inferior, and moreover, the film is expensive.

The biaxially stretched polyamide resin film may be provided with a protective layer by coating or printing other resins such as polyvinylidene chloride, polyvinyl chloride, silicone or teflon, or may be metallized.

The metal membrane layer may be composed of a metal simplex such as Al, Sn, Zn, Co, Cr, Ni, Fe or Cu, an alloy or other metals capable of forming a membrane. Aluminum is the most suitable in view of cost and processability. The metal membrane may be formed by a known method such as vacuum deposition, sputtering, ion plating or electron beam heating. A suitable thickness of the metal membrane is 50 to 1200 Å in view of securing physical strength, light-shielding, antistatic property, moistureproofness and cost. When the thickness is less than 50 Å, moistureproofness, gas barrier and light-shielding are inferior. Moreover, static electrification generated on both sides of the metal membrane cannot be eliminated. While, when the thickness is beyond 1200 Å, the heat in the vacuum deposition process degrades the biaxially stretched polyamide resin film and decreases the physical strength of the laminated film, though antistatic property, moistureproofness and light-shielding can be secured. In the case of aluminum membrane, a preferable thickness is 80 to 800 Å, and 100 to 600 Å is particularly preferred.

In order to improve adhesiveness of the metal membrane layer, the biaxially stretched polyamide resin film may be provided with an anchor coat layer. The anchor coating agent may be conventional such as polyethyleneimine, polyisocyanate, polyurethane, alkyl titanate, polybutadiene, polyolefin, polyester or the like, and the anchor coat layer may be provided by applying the anchor coating agent by means of gravure roll coating, kiss roll coating, bar coating, dropping coating or the like. The surface of the biaxially stretched polyamide resin film may be treated by glow discharge, corona discharge, ultraviolet irradiation, ozone treatment, chemical reagent treatment, flame treatment, or the like.

The very low density ethylene-α-olefin copolymer resin is a copolymer of ethylene and α-olefin such as butene-1, hexene-1, 4-methylpentene-1 or octene-1, and has a density of less than 0.915 g/cm$^3$. When the density is beyond 0.915 g/cm$^3$, bag rupture is liable to occur during transportation due to the degradation of the resistance to the occurrence of pinholes. Heat sealing properties are also degraded. The very low density ethylene-α-olefin copolymer resin is produced by the vapor or liquid phase low pressure or medium-pressure process, the modified high-pressure ionic polymerization process or the like. Representative commercial resins have a melt flow rate (MFR, ASTM D-1238) of 0.4 to 20 g/10 minutes and a density (ASTM D-1505) of 0.89 to 0.91 g/cm$^3$. The very low density ethylene-α-olefin copolymer resin film is formed in a thickness of more than 15 μm, preferably 30 to 150 μm by the T die process or the inflation process. The very low density ethylene-α-olefin copolymer resin film layer may be incorporated into a coextruded multilayer inflation film. In this case, the very low density ethylene-α-olefin copolymer resin film layer is preferably disposed as the innermost layer, and the innermost layers are joined by blocking. By laminating the very low density ethylene-α-olefin copolymer resin film to the biaxially stretched polyamide resin film through the adhesive layer, tear strength, impact strength and the like of the laminated film are improved by the notch effect. Particularly, resistance to the occurrence of pinholes is much superior to other laminated films containing similar ethylene-α-olefin copolymer resin film layers. The above effects are greater in the case of containing a light-shielding material. The resistance to the occurrence of pinholes of the laminated film of the invention is much better than the coextruded multilayer inflation film having a similar sectional structure.

The very low density ethylene-α-olefin copolymer resin film is laminated to the biaxially stretched polyamide resin film through the adhesive layer. The adhesive used for the adhesive layer is a known adhesive, such as adhesives for dry lamination, adhesives for hot melt lamination, adhesives for extrusion lamination, etc. The adhesives for dry lamination include isocyanate adhesives and polyurethane adhesives, and the adhesives for hot melt lamination include blended adhesives of paraffin wax, microcrystalline wax with ethylene copolymer resins. The adhesives for extrusion lamination includes various homopolymer resins such as polyethylene resins, polypropylene resins and polybutene resins, ethylene copolymer resins such as EVA resins, EEA resins, EAA resins and L-LDPE, resins, ionomer resins (ionic copolymers e.g. "Surlyn" from Dupont and "Himiran" from Mitsui Polychemicals) and adhesive polymers which are polyolefin resins modified by grafting unsaturated carboxylic acid compound (e.g. "Admer" from Mitsui Polychemicals), and LDPE, L-LDPE resin and a mixture thereof are preferred in view of excellent laminating properties and inexpensiveness. The thickness of the adhesive layer is usually 8 to 50 μm, preferably 10 to 20 μm, in the case of the adhesives for extrusion lamination. However, the thickness may be changed according to cost, laminating speed, the thickness of the laminate and the like.

The light-shielding material is incorporated into at least one of the biaxially stretched polyamide resin film layer, the very low density ethylene-α-olefin copolymer resin film layer and the adhesive layer. Examples of the light-shielding material are described below.

Inorganic Compounds:

Oxides . . . silica, diatomaceous earth, alumina, titanium oxide, iron oxide, zinc oxide, magnesium oxide, antimony oxide, barium ferrite, strontium ferrite, beryllium oxide, pumice, pumice balloon, alumina fiber, etc.

Hydroxides . . . aluminum hydroxides, magnesium hydroxides, basic magnesium carbonate, etc.

Carbonates . . . calcium carbonate, magnesium carbonate, dolomite, dawsonite, etc.

Sulfates, sulfites . . . calcium sulfate, barium sulfate, ammonium sulfate, calcium sulfite, etc.

Silicates . . . talc, clay, mica, asbestos, glass fiber, glass balloon, glass bead, calcium silicate, montmorillonite, bentonite, etc.

Carbons . . . carbon black, graphite, carbon fiber, carbon hollow bead, etc.

Others . . . iron powder, copper powder, lead powder, tin powder, stainless steel powder, pearl pigment, aluminum powder, molybdenum sulfide, boron fiber, silcon carbide fiber, brass fiber, potassium titanate, zirconium titanate, zinc borate, barium metaborate, calcium borate, sodium borate, aluminum paste, etc.

Organic Compounds: wood flour such as pine, oak and sawdust, husk fiber such as almond, peanut and chaff, colored various fibers such as cotton, jute, paper pieces, cellophane pieces, nylon fiber, polypropylene fiber, starch, aromatic polyamide fiber, etc.

Among them, preferred light-shielding materials are the inorganic compounds providing opacity and light-absorptive carbon black, titanium nitride and graphite are particularly preferred because of being excellent in heat resistance and durability and being relatively inactive.

Carbon blacks are divided into gas black, oil furnace black, channel black, anthracene black, acetylene black, Ketjen carbon black, thermal black, lamp black, vegetable black and animal black according to their origin. Among these, oil furnace carbon black is preferable in terms of light-shielding character, cost and improvement of properties. On the other hand, since acetylene black and Ketjen carbon black have an antistatic character, they are also preferable, though they are expensive. They may be blended to the oil furnace black in order to improve its character.

Various additives may be added to the laminated film of the invention. Examples of the additives are described below.

(1) Conductive material;

nonionic surfactants, anionic surfactants, cationic surfactants, ampholytic surfactants, metal powders, metal flakes, surface coated pigments with metal, carbon fibers, metal fibers, whiskers, etc.

(2) Lubricant;

silicone lubricants, fatty acid amide lubricants, alkylamine lubricants, hydrocarbon lubricants, fatty acid lubricants, ester lubricants, alcohol lubricants, metal soaps, (3) Antiblocking agent; silicon dioxide, higher fatty acid polyvinyl esters, aluminum silicate, calcium silicate, etc.

(4) Plasticizer; phthalic acid esters, glycol esters, fatty acid esters, phosphoric acid esters, etc.

(5) Stabilizer; lead compounds, cadmium compounds, zinc compounds, alkaline earth metal compounds, organic tin compounds, etc.

(6) Antioxidant; phenol antioxidants, sulfur-containing antioxidants, phosphorus-containing antioxidants, etc.

(7) Flame retardant; phosphoric acid esters, phosphoric acid ester halides, halides, inorganic materials, polyols containing phosphorus, etc.

(8) Filler; alumina, kaoin, clay, calcium titanium dioxide, silica, etc.

(9) Reinforcing agent; glass lobing, metal fiber, glass fiber, glass milled fiber, carbon fiber, etc.

(10) Blowing agent; inorganic blowing agents (ammonium carbonate, sodium hydrogen carbonate), organic blowing agents (nitroso compounds, azo compounds), etc.

(11) Vulcanizing agent; vulcanization accelerator, acceleration assistant, etc.

(12) Deterioration preventing agent; ultraviolet absorber, antioxidant, metal deactivator, peroxide decomposing agent, etc.

(13) Coupling agent; silane compounds, titanium compounds, chromium compounds, aluminum compounds, etc.

(14) Nucleating agent; organic nucleating agents(-dibenzylidene sorbitol compounds, etc.), inorganic nucleating agents (calcium carbonate, etc.)

(15) Various thermoplastic resins, rubbers

The packaging material for photosensitive materials of the invention is suitable for packaging the following photosensitive materials:

Silver halide photographic photosensitive materials; X ray films, films for printing, monochrome and color photographic printing papers, color films, master papers for printing, DTR photosensitive materials, films and papers for computerized type setting system, microfilms, films for movie, self-developing type photographic photosensitive materials, direct positive films and papers, etc.

Diazonium photographic photosensitive materials; 4-morpholinobenzene diazonium microfilms, microfilms, copying films, form plates for printing, etc.

Azide, diazide photographic photosensitive materials containing parazidobenzoate, 4,4'-diazidostilbene, etc., such as copying films and form plates for printing etc.

Quinone diazide photographic photosensitive materials; photosensitive materials containing ortho-quinone diazide compounds or ortho-naphthoquinone diazide compounds, such as benzoquinone-(1,2)-diazido (2)-4-sulfonic acid phenyl ether, such as form plates for printing, copying films and contact printing film, etc.

Photo polymers; photosensitive materials, form plates for printing, contact printing films, containing vinyl compound monomer, etc.

Polyvinyl cinnamate esters; printing films, photoresists for IC, etc.

Moreover, the packaging material of the invention is also applicable to various photosensitive materials degraded or denatured by light, oxygen, sulfur dioxide gas or the like, such as foods including butter, peanuts, margarine, snacks, relishs, cakes, teas and lavers, medicines including powder and granular medicines placed in a bag for stomach and bowels and for colds, dyes, pigments, photographic developing agents, photographic fixing agents, toners, long term storage of printed matters containing rubbers, resins such as ABS resin, dyes, pigments, etc. or photographs.

In the packaging material for photographic photosensitive materials of the invention, the biaxially stretched polyamide resin film layer imparts toughness, heat resistance, cold resistance, oil resistance and gas barrier to the laminated film, and improves physical strength, resistance to the occurrence of pinholes and oxygen barrier. Besides, the heat resistance improves bag-making ability, and the great Young's modulus improves shock resistance to prevent elongation. Polyamide is biodegradable, and therefore, favors waste treatment. The very low density ethylene-α-olefin copolymer resin film layer improves resistance to the occurrence of pinholes and tear strength. Moreover, it imparts heat sealability to the laminated film, and improves low temperature heat sealability, heat seal tolerance, hot tack properties, heat seal strength, heat sealability with other materials, aging heat seal strength, etc. By the lamination of them through the adhesive layer, tear strength and impact strength are improved by the notch effect. Resistance to the occurrence of pinholes is particularly improved. The light-shielding material imparts light-shielding ability to the laminated film. Thus, the packaging material of the invention is excellent in physical strength such as impact puncture strength, tear strength, and Gelbo test strength, resistance to the occurrence of pinholes, antistatic property, moisture-proofness, oxygen barrier and bag-making ability.

Representative embodiments of the packaging material of the invention are illustrated in FIGS. 1 through 6.

The packaging material of FIG. 1 is composed of the biaxially stretched polyamide resin film layer 1 and the very low density ethylene α-olefin copolymer resin film layer 3a containing the light-shielding material laminated thereto through the adhesive layer 2.

Figure 2:
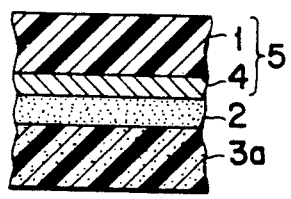

The packaging material of FIG. 2 is the same as the packaging material of FIG. 1, except that the biaxially stretched polyamide resin film layer 1 is provided with a metal membrane layer 4 on the side of the adhesive layer 2 to form a metallized biaxially stretched polyamide resin film layer 5.

Figure 3:
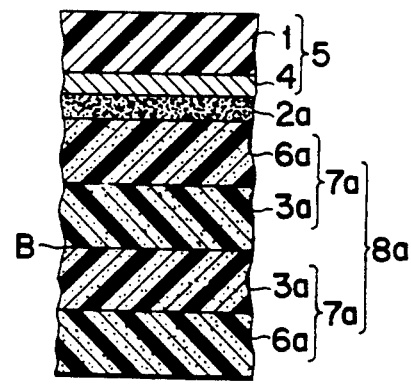

The packaging material of FIG. 3 is composed of a metallized biaxially stretched polyamide resin film layer 5 and a multilayer film laminate layer 8a laminated on the metal membrane layer 5 and a multilayer film laminate layer 8a laminated on the metal membrane layer 4 side through the adhesive layer 2a containing the light-shielding material. The multilayer film laminate layer 8a consists of the same two coextruded double layer film layers 7a symmetrically disposed and composed of the very low density ethylene-α-olefin copolymer resin film layer 3a containing the light-shielding material disposed on the inside and a thermoplastic resin film layer 6a containing the light shielding material disposed on the outside. Both coextruded double layer film layers 7a are joined by blocking B.

Figure 4:
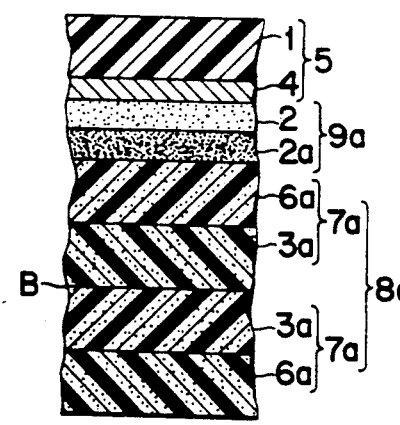

The packaging material of FIG. 4 is the same as the packaging material of FIG. 3, except that the adhesive layer is a coextruded double layer extrusion laminated adhesive layer 9a composed of the adhesive layer 2 and the adhesive layer 2a containing the light-shielding material.

Figure 5:
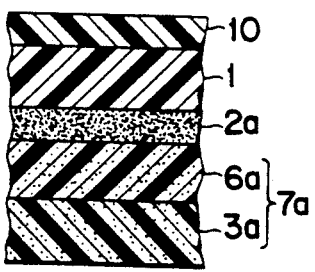

The packaging material of FIG. 5 is composed of the biaxially stretched polyamide resin film layer 1 and a coextruded double layer film layer 7a laminated through the adhesive layer 2a containing the light shielding material. The coextruded double layer film layer 7a consists of the very low density ethylene-α-olefin copolymer resin film layer 3a containing the light shielding material disposed on the outside and a thermoplastic resin film layer 6a containing the light-shielding material disposed on the inside. A coating agent 10 such as polyvinylidene chloride resin is coated on the outer surface of the biaxially stretched polyamide resin film layer 1.

Figure 6:
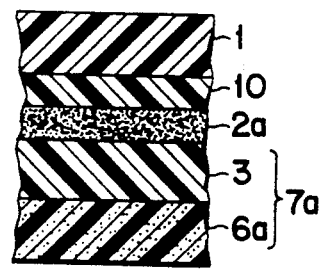
Figure 7:
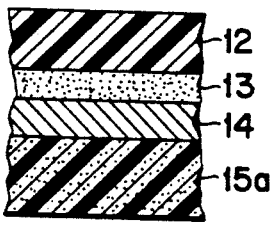
FIGS. 7 and 8 are partially sectional views indicating the layer constructions of conventional packaging materials.
Figure 8:
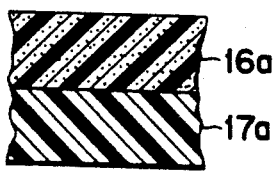

The packaging material of FIG. 6 is the same as the packaging material of FIG. 5, except that the coating agent 10 is coated on the inner surface of the biaxially stretched polyamide resin film layer 1, the coextruded double layer film layer 7a is reversed and the very low density ethylene-α-olefin copolymer resin film layer 3 does not contain the light-shielding material.

EXAMPLES

Example I

The packaging material of Example I corresponds to FIG. 1.

The biaxially stretched polyamide resin film layer 1 was a biaxially stretched nylon 6 resin film layer 25 μm in thickness.

The adhesive layer 2 was an extrusion laminated adhesive layer 13 μm in thickness of high pressure low density homopolyethylene resin having a MFR of 5.1 g/10 minutes and a density of 0.919 g/cm$^3$.

The very low density ethylene-α-olefin copolymer resin film layer 3a containing the light shielding material was 50 μm in thickness composed of very low density ethylene-butene-1 copolymer resin having a MFR of 1.0 g/10 minutes and a density of 0.900 g/cm$^3$ containing 6 wt. % of high pressure low density polyethylene resin having a MFR of 2.4 g/10 minutes and a density of 0.923 g/cm$^3$, 4 wt. % of oil furnace carbon black, 0.15 wt. % of nonionic surfactant ("Electrostripper TS-3", Kao) as antistatic agent, 0.2 wt. % of synthetic silica as antiblocking agent, 0.05 wt. % of fatty amide as lubricant, 0.1 wt. % of phenol antioxidant and 0.1 wt. % of phosphorus antioxidant, and formed by the inflation process.

Example II

The packaging material of Example II corresponds to FIG. 2.

The metallized biaxially stretched polyamide resin film layer 5 was composed of a biaxially stretched nylon 6 resin film layer 1 having a thickness of 15 μm and a vacuum deposited aluminum membrane layer 4 having a thickness of 400 Å.

The adhesive layer 2 was the same as Example I.

The very low density ethyene-α-olefin copolymer resin film layer 3a containing the light-shielding material was the same as Example I, except that the thickness was 60 μm.

Example III

The packaging material of Example III corresponds to FIG. 3.

The metallized biaxially stretched polyamide resin film layer 5 was the same as Example II.

The adhesive layer 2a was a light-shielding extrusion laminated adhesive layer 15 μm in thickness having a MI of 10 g/10 minutes and a density of 0.918 g/cm$^3$ composed of 40 wt. % of high pressure low density homopolyethylene resin, 57 wt. % of ethylene butene-1 copolymer resin and 3 wt. % of oil furnace carbon black.

The multilayer film laminated layer 8a consisted of the same two coextruded double layer film layers 7a symmetrically disposed. Each coextruded double layer film layer 7a consisted of the very low density ethylene-α-olefin copolymer resin film layer 3a containing the light-shielding material 15 μm in thickness composed of 97 wt. % of very low density ethylene-butene-1 copolymer having a MFR of 0.8 g/10 minutes and a density of 0.906 g/cm$^3$ and 3 wt. % of oil furnace carbon black disposed on the inside and a thermoplastic resin film layer 6a containing the light-shielding material 15 μm in thickness composed of 20 wt. % of high density polyethylene resin having a MFR of 1.1 g/10 minutes and a density of 0.954 g/cm$^3$, 72.5 wt. % of ethylene-4-methylpentene-1 copolymer resin having a MFR of 2.1 g/10 minutes and a density of 0.920 g/cm$^3$, 4.5 wt. % of gh pressure low density hompolyethylene resin having a MFR of 2.4 g/10 minutes and a density of 0.923 g/cm$^3$, 3 wt. % of oil furnace carbon black, 0.05 wt. % of polyoxyethylenealkylamine, 0.1 wt. % of fatty acid monoglyceride and 0.05 wt. % of erucic amide disposed on the outside. Both coextruded double layer film layers were joined by blocking.

Example IV

The packaging material of Example IV corresponds to FIG. 4.

The metallized biaxially stretched polyamide resin film layer 5 was the same as Example II.

The adhesive layer 2 of the coextruded double layer extrusion laminated adhesive layer 9a had a thickness of 5 μm, and was composed of 20 wt. % of modified ethylene copolymer resin wherein unsaturated carboxylic acid was incorporated into ethylene by graft polymerization and 80 wt. % of high pressure low density polyethylene resin having a MFR of 2.4 g/10 minutes and a density of 0.923 g/cm$^3$. The adhesive layer 2a containing the light-shielding material disposed on the multilayer film laminated layer 8a side had a thickness 10 μm and the same resin composition as Example III.

The multilayer film laminated layer 8a was the same as Example III.

Comparative Example I

The packaging material of Comparative Example I was similar to FIG. 2.

The metallized biaxially stretched polyamide resin film layer 5 was the same as Example II.

The adhesive layer 2 was also the same as Example II.

Instead of the very low density ethylene-α-olefin copolymer resin film layer 3a, a light-shielding L-LDPE resin film layer composed of 97 wt. % ethylene-4-methylpentene-1 copolymer resin having a MFR of 2.1 g/10 minutes and a density of 0.935 g/cm³ and 3 wt. % of oil furnace carbon black was used.

Comparative Example II

The packaging material of Comparative Example II was similar to FIG. 2.

The metallized biaxially stretched polyamide resin film layer 5 and the adhesive layer 2 were the same as Example II.

The layer used instead of the very low density ethylene-α-olefin copolymer resin film layer 3a was a light-shielding low density homopolyethylene resin film layer 60 μm in thickness composed of 97 wt. % of high pressure low density homopolyethylene resin having a MFR of 2.4 g/10 minutes and a density of 0.923 g/cm³ and 3 wt. % of oil furnace carbon black.

Comparative Example III

The packaging material of Comparative Example III was a light-shielding coextruded triple layer inflation film consisting of a modified nylon resin ("Novamid #1023 CAX" from Mitsubishi Chemical Industries) layer 20 μm in thickness, a modified polyolefin resin ("Admer #NF300" from Mitsui Petrochemical Industries) layer 20 μm in thickness having a MFR of 1.5 g/10 minutes and a density of 0.94 g/cm³, and a light shielding low density homopolyethylene resin layer 50 μm in thickness composed of 97 wt. % of high pressure low density homopolyethylene resin having a MFR of 2.4 g/10 minutes and a density of 0.923 g/cm³ and 3 wt. % of oil furnace carbon black.

Some properties of the packaging materials of Examples I through IV and Comparative Examples I through III were measured, and the results are summarized in Table 1.

Evaluations in Table 1 were carried out as follows:

| A very excellent | B excellent |
|---|---|
| C practical | D having a problem |
| E impractical | |

Testing methods were as follows:

Generation Rate of Pinholes: Three-sided fin seal bags having of quart size were prepared using each example film, and 50 sheets of quart lithfilm were placed therein and sealed. The bags were subjected to shaking test in the level II of JIS Z-0232, and then exposed to the light of 80,000 luxes for 60 minutes. The lithfilms were developed, and evaluated by the degree of fogging.

Gelbo Test Strength: Evaluated by the number of curvatures until pinholes are generated in each example film by using an apparatus of U.S. Military Standard MIL B-131G.

Generation of Static Marks: Three-sided fin seal bags having of quart size were prepared using each example film, and a stack of 50 sheets of quart lithfilm was taken in and out of the bag twice at 20° C. at 30% RH. Then, the lithfilms were developed, and evaluated by static marks through visual observation.

I claim:

1. A packaging material for photographic photosensitive materials which comprises a biaxially stretched nylon resin film having a draw ratio of 3 to 20 times in both a longitudinal direction and a lateral direction and a very low density ethylene-α-olefin copolymer resin film layer having a density of less than 0.906 g/cm³ laminated through an adhesive layer and contains a light-shielding material at least in one layer.

2. The packaging material of claim 1 wherein the adhesive layer side surface of the biaxially stretched polyamide resin film layer is metallized.

TABLE 1

| | Invention | | | | Comparative | | |
|---|---|---|---|---|---|---|---|
| | I | II | III | IV | I | II | III |
| Layer Construction | FIG. 1 | FIG. 2 | FIG. 3 | FIG. 4 | Similar to FIG. 2 | Similar to FIG. 2 | Triple Layer Coextruded Inflation Film |
| Outermost Layer Kind | Biaxially Stretched Nylon 6 Resin Film | Al-Metallized Biaxially Stretched Nylon 6 Resin Film | " | " | Similar to FIG. 2 | Similar to FIG. 2 | Modified Nylon Resin Layer |
| Thickness (μm) | 25 | 15 | 15 | 15 | 15 | 25 | 20 |
| Adhesive Layer Kind | LDPE Extrusion Laminated Adhesive Layer | Al-Metallized Biaxially Stretched Nylon 6 Resin Film | Blended Resin* Extrusion Laminated Adhesive Layer | Double Layer Coextruded Extrusion Laminated Adhesive Layer | LDPE Resin Extrusion Laminated Adhesive Layer | Similar to FIG. 2 | Modified Polyolefin Resin Layer |
| Thickness (μm) | 13 | 13 | 15 | 5 + 10 | 13 | 13 | 20 |
| Innermost Layer Kind | Light-Shielding Very Low Density Ethylene-α-Olefin Single Layer Inflation Film | Al-Metallized Biaxially Stretched Nylon 6 Resin Film | Light-Shielding Multilayer Laminated Film | Double Layer Coextruded Extrusion Laminated Adhesive Layer | Light-Shielding 6-LDPE Resin Inflation Film | Light-Shielding LDPE Resin Inflation Film | Light-Shielding LDPE Resin Layer |
| Thickness (μm) | 50 | 60 | 60 | 60 | 60 | 60 | 50 |
| Generation Rate of Pinholes (%) | 0 | 3 | 0 | 0 | 31 | 43 | 58 |
| Gelbo Test Strength | A | A | A | A | C | D | D |
| Generation of Static Marks | None | None | None | None | Slightly | Slightly | Frequently |

*Blend of carbon black, LDPE and ethylene-butene-1 copolymer

3. The packaging material of claim 1 wherein the adhesive layer is a LDPE resin layer or a L-LDPE resin layer.

4. The packaging material of claim 1 wherein the adhesive layer is a coextruded multilayer.

5. The packaging material of claim 1 wherein the very low density ethylene-α-olefin copolymer resin film layer is a part of a coextruded multilayer inflation film.

6. The packaging material of claim 5 wherein the very low density ethylene-α-olefin copolymer resin film layer is a disposed as the innermost layer of the coextruded multilayer inflation film and the innermost layers are joined by blocking.

* * * * *